(12) United States Patent
Jiang et al.

(10) Patent No.: US 11,768,667 B2
(45) Date of Patent: Sep. 26, 2023

(54) COMPILING METHOD, COMPILING DEVICE, EXECUTION METHOD, COMPUTER-READABLE STORAGE MEDIUM AND COMPUTER DEVICE

(71) Applicant: BOE Technology Group Co., Ltd., Beijing (CN)

(72) Inventors: Sujia Jiang, Beijing (CN); Cunqing Li, Beijing (CN); Kun Li, Beijing (CN); Zhe Zhang, Beijing (CN); Zhenyan Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 23 days.

(21) Appl. No.: 17/684,939

(22) Filed: Mar. 2, 2022

(65) Prior Publication Data
US 2022/0308847 A1   Sep. 29, 2022

(30) Foreign Application Priority Data
Mar. 26, 2021  (CN) .......................... 202110323733.9

(51) Int. Cl.
G06F 8/41 (2018.01)
(52) U.S. Cl.
CPC ...................... *G06F 8/47* (2013.01)
(58) Field of Classification Search
CPC ....................................................... G06F 8/47
See application file for complete search history.

(56) References Cited

PUBLICATIONS

Schranz et al. "Towards Principled Dynamic Analysis on Android" (Year: 2020).*
AE Fentaw, "Cross platform mobile application development: a comparison study of React Native Vs Flutter" (Year: 2020).*
F Fagiello, "Performance Comparison Between React Native and Flutter" (Year: 2019).*
T Tran, "Flutter Native Performance and Ex-pressive UI/UX" (Year: 2020).*
F Zammetti, "Practical Flutter: Improve your Mobile Development with Google's Latest Open-Source SDK" (Year: 2019).*

* cited by examiner

*Primary Examiner* — Phillip H Nguyen
(74) *Attorney, Agent, or Firm* — IPRO, PLLC

(57) ABSTRACT

A Flutter-based compiling method, a compiling device, an executing method, a computer-readable storage medium, and a computer device are provided. The Flutter-based compiling method includes: receiving configuration content; in response to the configuration content, compiling and generating an executable file, where the executable file includes at least two of a Native component, a Flutter Native component and a Flutter dynamic component, and is configured to generate a routing table during operation, to enable the Native component, the Flutter Native component and the Flutter dynamic component to communicate with each other through the routing table.

20 Claims, 3 Drawing Sheets

COMPILING METHOD, COMPILING DEVICE, EXECUTION METHOD, COMPUTER-READABLE STORAGE MEDIUM AND COMPUTER DEVICE

CROSS-REFERENCE TO RELATED APPLICATIONS

This application claims priority to Chinese Patent Application No. 202110323733.9 filed in China on Mar. 26, 2021, the entire contents of which are incorporated herein by reference.

TECHNICAL FIELD

The present disclosure relates to the field of computer software technologies, and in particular, to a Flutter-based compiling method, a compiling device, an executing method, a computer-readable storage medium, and a computer device.

BACKGROUND

With the increasing demand of mobile terminals, which is changing day by day, each large company has shown a very high interest in cross-platform, and especially after google releases Flutter (a mobile user interface framework released by google), more and more companies and teams invest in manpower and material resources on Flutter development. However, Flutter is a solution for cross-platform, and some special Native requirements (program writing mode based on smartphone local operating system) still depend on Native Application Program Interface (API), so it is a problem that we want to solve how Native components and Flutter components automatically communicate.

SUMMARY

A Flutter-based compiling method is provided in the present disclosure, including:
receiving configuration content;
in response to the configuration content, compiling and generating an executable file, where the executable file includes at least two of a Native component, a Flutter Native component and a Flutter dynamic component, and is configured to generate a routing table during operation, to enable the Native component, the Flutter Native component and the Flutter dynamic component to communicate with each other through the routing table.

Optionally, the compiling and generating the executable file in response to the configuration content further includes:
in response to the configuration content, selecting a preset project template to establish a project; and
compiling the project and generating the executable file.

Optionally, the executable file includes an executable file adapted for at least one application system;
the application system includes a Windows system, an Android system and an IOS system.

Optionally, the Native component is a program code written in a system language of one of the plurality of application systems, and includes a business component and a functional component.

Optionally, the Native component, the Flutter component and the Flutter dynamic component each include at least one program module,
the in response to the configuration content, compiling and generating the executable file includes:
the program modules of the Native component, the Flutter Native component and the Flutter dynamic component be mutually called through the routing table.

A compiling device is provided in the present disclosure, including a memory, a processor, and a computer program stored on the memory and executable on the processor, where the processor is configured to execute the computer program to perform:
receiving configuration content;
in response to the configuration content, compiling and generating an executable file, where the executable file includes at least two of a Native component, a Flutter Native component and a Flutter dynamic component, and is configured to generate a routing table during operation, to enable the Native component, the Flutter Native component and the Flutter dynamic component to communicate with each other through the routing table.

Optionally, the processor is configured to execute the computer program to perform:
in response to the configuration content, selecting a preset project template to establish a project; and
compiling the project and generating the executable file.

Optionally, the executable file includes an executable file adapted for at least one application system;
the application system includes a Windows system, an Android system and an IOS system.

Optionally, the Native component is a program code written in a system language of one of the plurality of application systems, and includes a business component and a functional component.

Optionally, the Native component, the Flutter component and the Flutter dynamic component each include at least one program module,
where the processor is configured to execute the computer program to perform:
enabling the program modules of the Native component, the Flutter Native component and the Flutter dynamic component to be mutually called through the routing table.

An execution method of an executable file obtained using the compilation method hereinabove is provided in the present disclosure, including:
starting an executable file and generating a routing table according to configuration content, where the executable file includes at least two of a Native component, a Flutter Native component and a Flutter dynamic component;
selecting an entry address from one of the Native component, the Flutter Native component and the Flutter dynamic component according to the configuration content; and
executing a program according to the entry address, and communicating among the Native component, the Flutter Native component and the Flutter dynamic component through the routing table according to the configuration content.

Optionally, the Native component, the Flutter Native component and the Flutter dynamic component respectively includes at least one program module, the starting the executable file and generating the routing table according to the configuration content further includes:
starting the executable file and generating an execution configuration file in response to the configuration content, where the execution configuration file includes an entry option and a communication flow among the Native component, the Flutter Native component and the Flutter dynamic component;
generating the routing table according to the execution configuration file, where the routing table includes calling identifiers of program modules of the Native component, the Flutter Native component and the Flutter dynamic component and running identifiers corresponding to the calling identifiers;

the selecting the entry address from one of the Native component, the Flutter Native component and the Flutter dynamic component according to the configuration content further includes: selecting an entry address of a corresponding entry program module from a Native component, a Flutter Native component and a Flutter dynamic component according to the entry option of the execution configuration file;

the executing the program according to the entry address and communicating among the Native component, the Flutter Native component and the Flutter dynamic component through the routing table according to the configuration content further includes:

executing a corresponding program module according to the entry address and the communication flow;

acquiring the corresponding running identifier through the routing table according to the calling identifier of the communication flow; and calling the program module of the corresponding Native component, Flutter Native component or Flutter dynamic component according to the running identifier.

Optionally, the calling the program module of the corresponding Native component, Flutter Native component or Flutter dynamic component according to the running identifier further includes:

the program module of the Native component calling the program module of the Flutter Native component according to the running identifier, or the program module of the Flutter Native component calling the program module of the Native component according to the running identifier;

or

The program module of the Flutter dynamic component calling the program module of the Flutter native component according to the running identifier, or the program module of the Flutter native component calling the program module of the Flutter dynamic component according to the running identifier;

or the program module of the Native component calling the program module of the Flutter dynamic component according to the running identifier, or the program module of the Flutter dynamic component calling the program module of the Native component according to the running identifier.

A computer-readable storage medium storing a computer program is provided in the present disclosure, where the computer program is executed by a processor to perform the Flutter-based compiling method hereinabove.

Optionally, the computer program is executed by the processor to perform:

in response to the configuration content, selecting a preset project template to establish a project; and compiling the project and generating the executable file.

Optionally, the executable file includes an executable file adapted for at least one application system;

the application system includes a Windows system, an Android system and an IOS system.

Optionally, the Native component is a program code written in a system language of one of the plurality of application systems, and includes a business component and a functional component.

A computer device is provided in the present disclosure, including a memory, a processor, and a computer program stored on the memory and executable on the processor, where the processor is configured to execute the program to perform:

starting an executable file and generating a routing table according to configuration content, where the executable file includes at least two of a Native component, a Flutter Native component and a Flutter dynamic component;

selecting an entry address from one of the Native component, the Flutter Native component and the Flutter dynamic component according to the configuration content; and executing a program according to the entry address, and communicating among the Native component, the Flutter Native component and the Flutter dynamic component through the routing table according to the configuration content.

Optionally, the Native component, the Flutter Native component and the Flutter dynamic component respectively includes at least one program module, the processor is configured to execute the program to perform:

starting the executable file and generating an execution configuration file in response to the configuration content, where the execution configuration file includes an entry option and a communication flow among the Native component, the Flutter Native component and the Flutter dynamic component;

generating the routing table according to the execution configuration file, where the routing table includes calling identifiers of program modules of the Native component, the Flutter Native component and the Flutter dynamic component and running identifiers corresponding to the calling identifiers;

the selecting the entry address from one of the Native component, the Flutter Native component and the Flutter dynamic component according to the configuration content further includes: selecting an entry address of a corresponding entry program module from a Native component, a Flutter Native component and a Flutter dynamic component according to the entry option of the execution configuration file;

the processor is configured to execute the program to perform:

executing a corresponding program module according to the entry address and the communication flow;

acquiring the corresponding running identifier through the routing table according to the calling identifier of the communication flow; and calling the program module of the corresponding Native component, Flutter Native component or Flutter dynamic component according to the running identifier.

Optionally, the processor is configured to execute the program to perform:

calling the program module of the Flutter Native component according to the running identifier, or calling the program module of the Native component according to the running identifier;

or calling the program module of the Flutter native component according to the running identifier, or calling the program module of the Flutter dynamic component according to the running identifier;

or calling the program module of the Flutter dynamic component according to the running identifier, or calling the program module of the Native component according to the running identifier.

BRIEF DESCRIPTION OF THE DRAWINGS

In order to more clearly illustrate the technical solutions in the embodiments of the present disclosure, the drawings required to be used in the description of the embodiments are briefly introduced below, and it is apparent that the drawings in the description below are only some embodiments of the present disclosure, and it is obvious for those skilled in the art that other drawings may be obtained according to the drawings without creative efforts.

DETAILED DESCRIPTION

Figure 1:
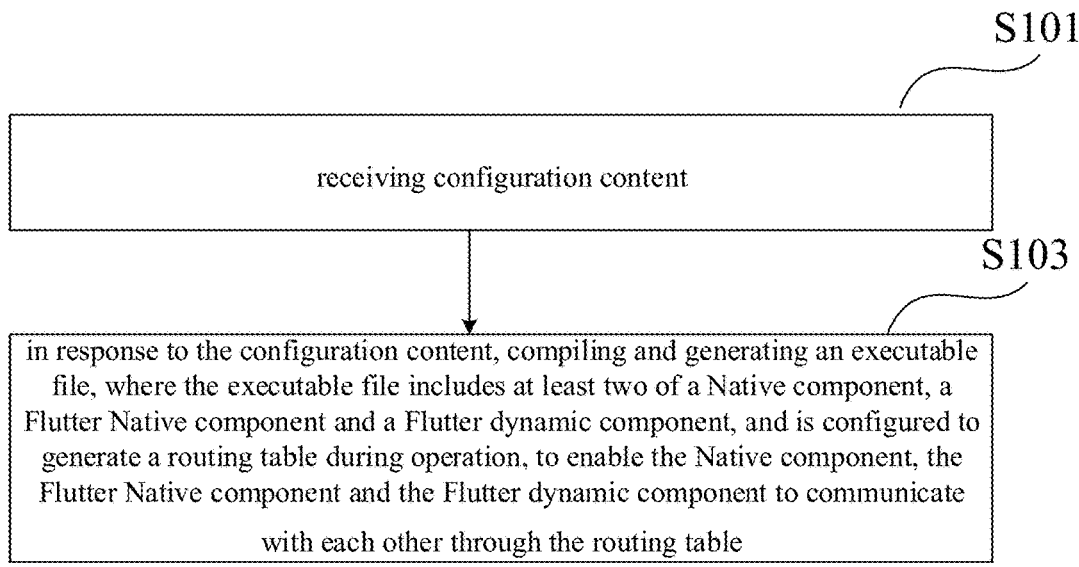
FIG. 1 shows a schematic flow chart of a compiling method according to an embodiment of the disclosure.

To more clearly illustrate the present disclosure, the present disclosure is further described below in conjunction with the preferred embodiments and the accompanying drawings. Similar components in the figures are denoted by the same reference numerals. It is to be understood by persons skilled in the art that the following detailed description is illustrative and not restrictive, and is not to be taken as limiting the scope of the present disclosure.

A program module in the present disclosure is a one-level independent, identifiable program instruction that can be processed by an assembler, compiler, loader, or translator as a whole. Which is an integral part of a large program instruction. In Windows, the term "module" refers generally to any collection of executable code and data that can be loaded into and run on a memory. More specifically, an EXE file (also referred to as an application module), or a Dynamic Link Library (DLL), also referred to as a Dynamic link Library module or DLL module, or a device driver, may be a data resource that a program contains and that can be accessed by another program. The term module is also used to refer to a self-contained program.

The Component (Component) in this disclosure is a simple encapsulation of data and methods. In C++ Builder, a component is a specific object derived from TComponent. A component may have its own properties and methods. Attributes are simple visitors of component data. The method is some simple and visible function of the component. The use of components may enable drag-and-drop programming, fast property handling, and true object-oriented design. The VCL and CLX components are the core of the C++ Builder system.

Currently, although Flutter provides a channel for developers to communicate Native components with Flutter components, such as EventChannel and MethodChannel, since API-based is preset in advance, if communication is to be performed, a large amount of coupled code needs to be written in the Flutter engineering and Native engineering at the time of application construction, that is, a large amount of redundant code is coupled in the main engineering, which is not beneficial for the design of a complete componentization scheme.

In view of one of the above problems, as shown in FIG. 1, an embodiment of the present disclosure provides a compiling method based on Flutter, including:

S101, receiving configuration content;

S103, in response to the configuration content, compiling and generating an executable file, where the executable file includes at least two of a Native component, a Flutter Native component and a Flutter dynamic component, and is configured to generate a routing table during operation, to enable the Native component, the Flutter Native component and the Flutter dynamic component to communicate with each other through the routing table.

In the embodiment, the executable file is generated by performing mixed compiling in response to the configuration content, and the executable file can generate the routing table during running, so that communication among the Native component, the Flutter Native component and the Flutter dynamic component is realized, absolute decoupling among the Native component, the Flutter Native component and the Flutter dynamic component is realized, redundant codes in main engineering are avoided, the development process is simplified, and the method has a wide application prospect.

For a further understanding of the present disclosure, the methods and device of the present disclosure are described in detail below with reference to specific examples.

Figure 2:
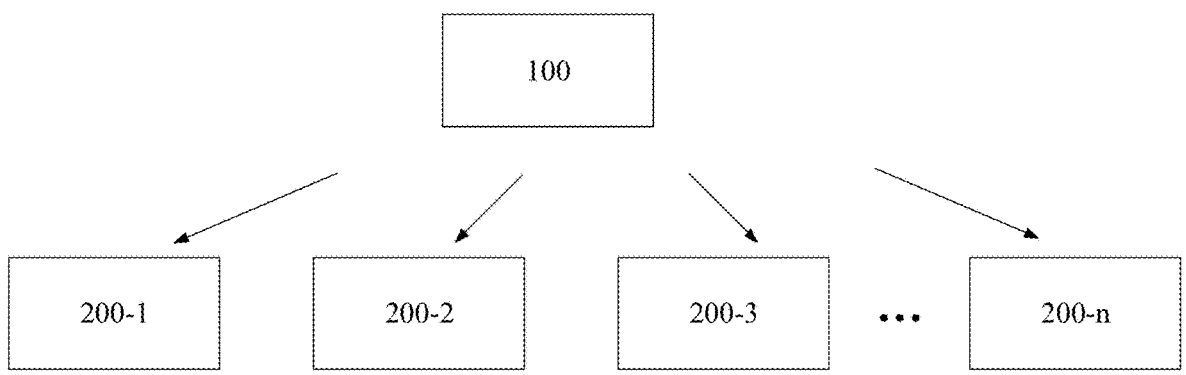
FIG. 2 illustrates a hardware system block diagram for compiling and executing an embodiment of the present disclosure.

As shown in FIG. 2, a block diagram of a typical hardware system of compiled and executed executable files is shown. The hardware system includes a compiling device 100 and terminal devices 200-1, 200-2, 200-3, . . . , 200-n that execute executable files generated by the compiling device.

In an embodiment of the present disclosure, the compiling device 100 may be a desktop, a tablet, a notebook, etc. on which the Jenkins service and the Flutter-based compiler are loaded. The terminal devices 200-1, 200-2, 200-3, . . . , and 200-n are terminal devices that are loaded with one or more of a Windows system, an Android system, and an IOS system, such as a mobile phone, a desktop computer, a tablet computer, and a notebook computer. Of course, the terminal device is equipped with a plurality of the above systems, and refers to a terminal device that allows multi-system switching. When no distinction is required, the terminal device is denoted with reference numeral 200.

The compiling device 100 performs hybrid compiling based on the configuration of the developer to generate an executable file, and the terminal device 200 downloads the executable file, installs and executes the executable file. The terminal device 200 may download the executable file directly or indirectly, that is, may directly access the compiling device 100 to download the executable file; or when the compiling device 100 uploads the executable file to an application cloud server, for example, an APP Store, the terminal device 200 logs in the application cloud server to indirectly download the executable file.

In a specific example, referring to FIG. 1 and FIG. 2, in step S101, the compiling device 100 receives configuration contents input by a developer through Jenkins service, for example, an application show name, a project name, a Bundle ID, a Build number, a CocoaPods source, a public library name, a public library version, a private library name, and other modification items.

In step S103, in response to the configuration content, the compiling device 100 compiles and generates an executable file.

Specifically, the compiling device 100 selects a preset project template in response to the configuration content to build a template project. For example, an assignment project template is executed to a specified project folder through a script, a project name and an external folder name are automatically modified according to configuration content, and a generated project folder is generated. Here, whether the entry is determined to be a native component entry, a Flutter native component entry, or a Flutter dynamic component entry is selected by the compiling device 100. In addition, at AppDelegate of the main project, the communication flow that generated the project is instantiated.

The compiling device 100 performs hybrid compiling based on the established engineering template and generates an executable file, where the executable file includes an application file across platforms, namely at least two of a Native component, a Flutter Native component and a Flutter dynamic component. In an embodiment of the disclosure, is configured to generate a routing table at runtime, so that the Native component, the Flutter Native component, and the Flutter dynamic component communicate through the routing table.

The Native component is a program code written by using a system language of one of the application systems, namely, the program development of the application systems is realized by using one program language, so that the workload of the program development is greatly reduced, the development efficiency is improved, and the development cost is saved. The Native component includes a business component and a functional component, where the business component is a component with an interface, such as audio and video playing, logging and the like, and the functional component is a component with specific functions, such as electric quantity query, GPS acquisition and the like. The executable file may include both the service component and the functional component, or only one of the service component and the functional component, and the included service component or functional component may be one or more, and the disclosure is not limited thereto. In addition, the Flutter dynamic component is a dynamic framework of Flutter, and the Flutter native component is a business component or a functional component under the Flutter ecology.

According to the received configuration content, the executable files generated by the hybrid compiling device 100 include executable files suitable for at least one application system, where the application system includes a Windows system, an Android system, and an IOS system. Specifically, according to the generation option of the executable file set in the configuration content, the executable file applied to the Windows system, the Android system or the IOS system is generated, and the executable file of one system can be generated independently, or the executable files of a plurality of systems can be generated simultaneously. For example, only the executable file of the Android system is needed, the generation options of the executable file are set through Jenkins service, and Native codes and flute codes written by using the development language of the IOS system are mixed and compiled to generate the executable file suitable for the Android system; similarly, if the executable files of multiple application systems need to be generated, the generation options of the executable files are set in the Jenkins service, so that the executable files suitable for the multiple application systems are generated.

The routing table can be generated in the execution process through the executable file generated by the embodiment of the disclosure, so that mutual calling of the Native component, the Flutter Native component and the Flutter dynamic component in the cross-platform executable file of hybrid compilation is realized, coupling codes for communication among the Native component, the Flutter Native component and the Flutter dynamic component in the executable file are avoided being compiled, namely, the coupling relation among program codes is removed, absolute coupling among the program components is realized, and the problems in the related technology are solved.

Figure 4:
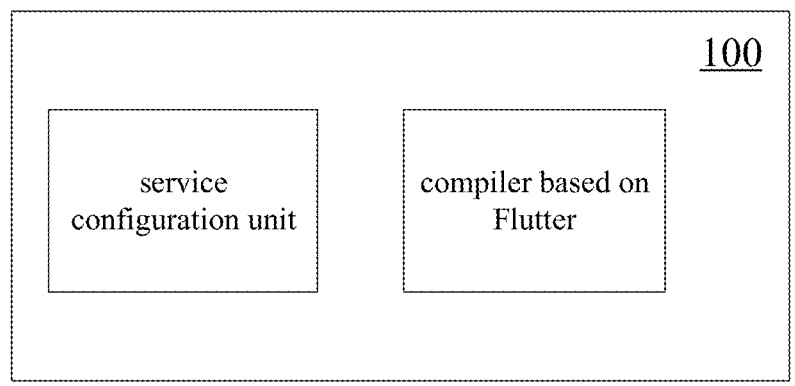
FIG. 4 shows a schematic block diagram of a compiling device according to an embodiment of the invention.

In an embodiment of the present disclosure, as shown in FIG. 4, there is provided a compiling device 100 for implementing the compiling method, including:

a service configuration unit configured to receive configuration content;

the compiler based on the Flutter is configured to compile in response to configuration content and generate an executable file, the executable file includes at least two of a Native component, a Flutter Native component and a Flutter dynamic component, and is configured to generate a routing table during running so that the Native component, the Flutter Native component and the Flutter dynamic component can communicate with each other through the routing table.

In this embodiment, the compiling device performs hybrid compiling and generates an executable file by in response to the configuration content, and the executable file can generate a routing table during running, so that communication among the Native components, the Flutter Native components and the Flutter dynamic components is realized, absolute decoupling among the Native components, the Flutter Native components and the Flutter dynamic components is realized, redundant codes in main engineering are avoided, the development process is simplified, and the method has a wide application prospect.

In an embodiment of the present disclosure, there is also provided an execution method executed on the terminal device 200, according to the executable file generated by the above compiling method:

S501, starting an executable file and generating a routing table according to configuration content, where the executable file includes at least two of a Native component, a Flutter Native component and a Flutter dynamic component;

S503, selecting an entry address from one of the Native component, the Flutter Native component and the Flutter dynamic component according to the configuration content; and S505, executing a program according to the entry address, and communicating among the Native component, the Flutter Native component and the Flutter dynamic component through the routing table according to the configuration content.

In this embodiment, the routing table is generated when the executable file is executed, so that communication among the Native component, the Flutter Native component, and the Flutter dynamic component is realized, absolute decoupling among the Native component, the Flutter Native component, and the Flutter dynamic component is realized, redundant codes in main engineering are avoided, the development process is simplified, and the method has a wide application prospect.

In a specific example, for example, assuming that the business requirement for writing configuration content in the executable file is a navigation item, and assuming that the executable file includes components of Native, Flutter, and Flutter dynamic components, the following process is followed when executing the executable file.

Figure 3:
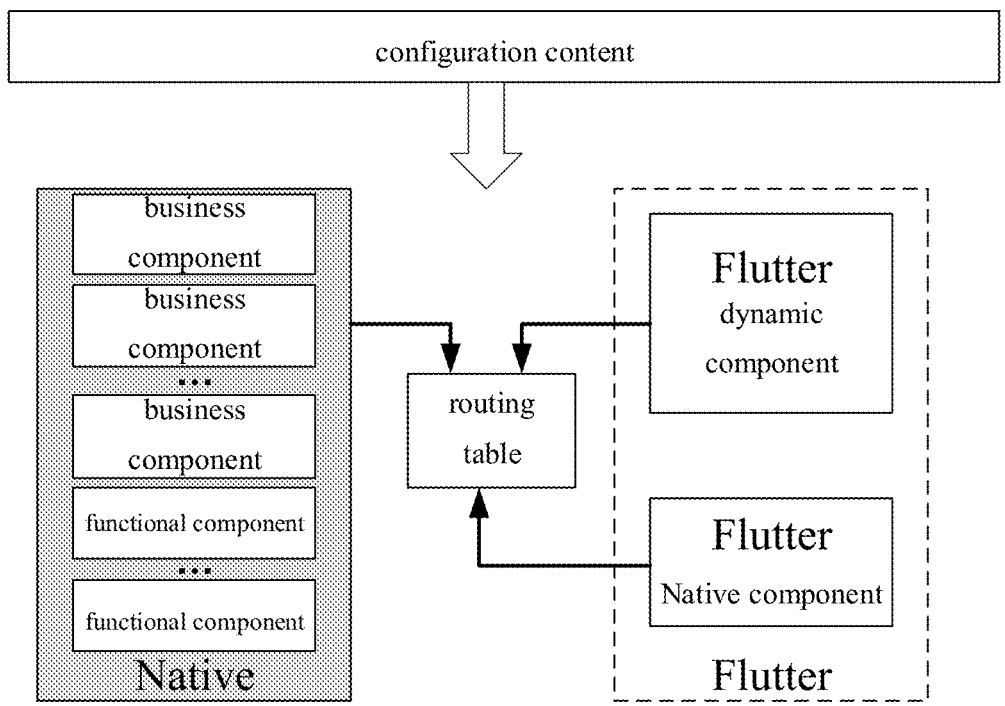
FIG. 3 illustrates a functional framework diagram for implementing a compile execution process according to an embodiment of the present disclosure.
Figure 5:
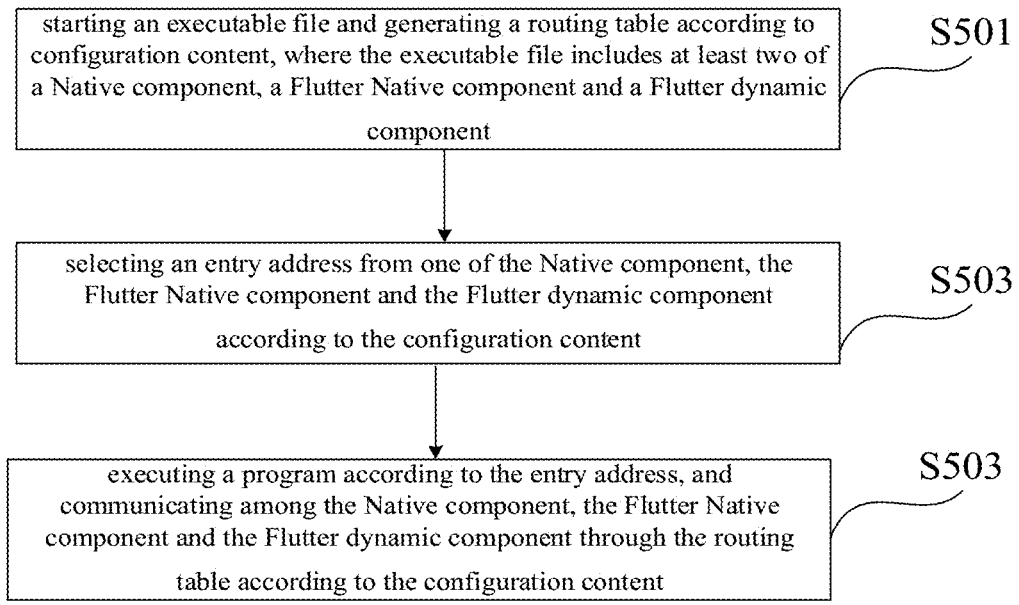
FIG. 5 shows a schematic flow chart of an execution method of an executable file obtained by using the compiling method of the present disclosure according to an embodiment of the present disclosure.

As shown in FIGS. 5 and 3, in step S501, when the mobile terminal device 200 downloads the executable file of the navigation item generated by the compiling device 100, the executable file is started in the system of the terminal device 200, and the routing table is generated according to the configuration content.

Optionally, when the executable file is started, generating an execution configuration file in response to the configuration content, where the execution configuration file includes an entry option and a communication flow among the Native component, the Flutter Native component, and the Flutter dynamic component; and generates a routing table from the execution profile. The routing table includes calling identifiers of program modules of the Native component, the Flutter Native component, and the Flutter dynamic component, and running identifiers corresponding to the calling identifiers, where the identifiers may be protocol strings or other identifiers, which is not specifically limited in this application.

It should be noted that the Native component, the Flutter Native component, and the Flutter dynamic component each include a plurality of program modules, for example, a program module for querying an electric quantity, a program module for logging in, a program module for connecting a third party to pay, and the like, that is, each component exists in the form of a program module. Specifically, the Native component includes a plurality of business components, and each business component is an independent program module.

In an embodiment of the present disclosure, each program module in any one of the Native component, the Flutter Native component, and the Flutter dynamic component is called, that is, is communicated with the component, and the routing table includes a calling identifier and a running identifier, where the calling identifier is used by the running program module when another program module is called, and by querying the routing table, the running identifier corresponding to the calling identifier is obtained, and the another program module is executed according to the running identifier.

Specifically, for example, the Native component is called from the Flutter Native component through the routing table, one program module of the Flutter Native component is a currently running program, the running identifier of the pre-called Native component is obtained from the routing table through the calling identifier of the pre-called Native component configured in the configuration content, and the Native component is skipped to the program module in the Native component according to the running identifier and is run.

It can be understood that there are two cases of calls between Native, Flutter, and Flutter dynamic components.

For example, if the flute dynamic component is called from the currently running Native component, the program module of the Native component queries the routing table according to the calling identifier of the flute dynamic component, obtains the running identifier of the flute dynamic component, and jumps to the program module of the flute dynamic component by using the running identifier, or vice versa.

Similarly, calling the Flutter Native component from the Native component also means that the running Native component program module queries the routing table according to the calling identifier of the Flutter Native component, obtains the running identifier of the Flutter Native component, and jumps to the Flutter Native component program module by using the running identifier, or vice versa.

Similarly, calling the Flutter native component from the Flutter dynamic component also means that the running Flutter dynamic component program module queries the routing table according to the calling identifier of the Flutter native component, obtains the running identifier of the Flutter native component, and jumps to the Flutter native component program module by using the running identifier, and vice versa.

It should be noted that, in the present application, specific formats of the call identifier and the operation identifier of the routing table are not limited, and a person skilled in the art should select an appropriate format according to an actual application requirement, which is not described herein again.

In this embodiment, because the formats of the string parameters referenced by the program modules in the Native component, the Flutter Native component, and the Flutter dynamic component are different, the formats of the running identifiers for calling the program modules in the corresponding components are also different.

In one specific example:

if the flute Native component and the flute dynamic component communicate with the Native component, the flute Native component and the flute dynamic component receive parameters through a bottom-layer MethodChannel and then send the parameters to the parameter setting matched with the Native route, and therefore communication with the Native component is completed.

If the Native component communicates with the flute dynamic component, aiming at the way that the Widget and the dynamic plug-in of the flute dynamic component quote the character string parameters, the protocol character string format is formulated as follows:

platform://path?param1=xx&param2=xx& . . . &paramn=xx.

If the Native component and the Flutter dynamic component communicate with the Flutter Native component, since the Flutter dynamic component can be directly positioned to the fixed json page according to the path, the page of the Flutter Native component can be analyzed by instantiation, and therefore, a set of Native routing string protocol needs to be manually designed for the Flutter Native component.

Specifically, a Fluro open source framework is introduced, a routing distribution code is injected into the main.dart through a script, an inlet configuration plug-in of the Flutter framework is introduced into the main.dart, a callback distributed by a dynamic plug-in is bound to the inlet configuration plug-in, the inlet configuration plug-in forwards the dynamic information taken by us, and the communication plug-in forwards the protocol character string in the fixed format to a fixed page through a routing table. The protocol string format is for example:

flutter:///path?param1=xx&param2=xx& . . . &paramn=xx.

It should be noted that, just the communication protocol character strings of the Flutter native and Flutter dynamic components are different, and the routing communication of the routing table is also needed when the program modules of the Flutter native and Flutter dynamic components are called.

Based on the above communication principle, in the present example, specifically, according to the configuration content, if the navigation project is a project mainly based on a Native component, and enters and executes from an entry program module of the Native component, the Native component is required to communicate with the Flutter Native component and the Flutter dynamic component to call each program module of the Flutter Native component and the Flutter dynamic component. Accordingly, the routing table will include call identifiers that call the Flutter native component and the Flutter dynamic component and a run identifier corresponding to the call identifiers.

According to the configuration content, if the navigation project is a project which mainly includes a Flutter Native module, the Flutter Native module is used as a main operation module, the project enters and executes from an entrance program module of the Flutter Native module, and meanwhile, the Flutter Native module is required to communicate with a Native module and a Flutter dynamic module so as to call the program modules of the Flutter Native module and the Flutter dynamic module. Accordingly, the routing table will include the calling identifier of the Native component and the Flutter dynamic component and the running identifier corresponding to the calling identifier.

According to the configuration content, if the navigation project is a project which mainly includes a Flutter dynamic component, the Flutter dynamic component is used as a main operation component, the project enters and executes from an entrance program module of the Flutter dynamic component, meanwhile, the Flutter dynamic component needs to communicate with the Native component and the Flutter Native component to call each program module of the Native component and the Flutter Native component, and correspondingly, the routing table includes calling identifiers for calling the Native component and the Flutter Native component and operation identifiers corresponding to the calling identifiers.

In step S503, an entry address is selected from one of the Native component, the Flutter Native component, and the Flutter dynamic component according to the configuration content. Specifically, the entry address of the corresponding entry program module is selected from the Native component, the Flutter Native component and the Flutter dynamic component according to the entry option of the execution configuration file. In the embodiment of the present disclosure, the portal program module may be a native portal component of the native component, may also be main. And the portal program modules of the Flutter dynamic component and the Flutter native component are both main.

For example, if the navigation project is set in the configuration content as a Native component-based project, the executable file is selected to be launched from the portal program module of the Native component. Thus, in step S503, the executable file will automatically select the entry address of the native entry component.

If the navigation project is configured with the flute dynamic component as the main project, for example, the navigation project needs to use a large amount of dynamic components and embed a small amount of Native components and flute Native components, in step S503, the executable file will automatically select the main.

Optionally, if the navigation item is set to a project based on the Flutter native component in the configuration content, the executable file will automatically select the main address of the Flutter native component in step S503.

In step S505, the program is executed according to the entry address, and the Native component, the Flutter Native component, and the Flutter dynamic component are communicated with each other through the routing table according to the configuration content.

Specifically, corresponding program modules are executed according to the entry addresses and the communication flows; acquiring a corresponding running identifier through a routing table according to a calling identifier of a communication flow; and calling a program module of the corresponding Native component or Flutter dynamic component according to the running identifier.

It should be noted that although the above examples describe the flow of the execution method in terms of specific navigation items, those skilled in the art will appreciate that this is merely exemplary, and the present disclosure is not intended to limit the type of items to which the executable file belongs, nor the scope of application of the executable file, as other types of applications are possible.

In addition, the above example assumes an executable file generated by simultaneously mixing and compiling three of a Native component, a Flutter Native component, and a Flutter dynamic component, but embodiments of the present disclosure are not limited thereto. Besides, the executable file can be an executable file generated by only mixing a Native component and a Flutter dynamic component; or the executable file may be an executable file generated by only mixing the compiled Native components and the Flutter Native components; or the executable file may be an executable file generated by co-compiling the Flutter dynamic component and the Flutter native component.

In these embodiments, the execution method of the executable file is similar to the above examples, and the only difference is that the routing table generated according to the configuration content when the executable file is started in step S501 is different according to the types of the included components, because the composition of the executable file is different, the entry options and the communication flows included in the generated configuration file are different, and thus the call identifier and the run identifier included in the generated routing table are different; the entry address selected in step S503 differs depending on the composition of the executable file; the object to which the program module is called in the specific step of step S505 differs depending on the composition of the executable file.

It will be understood by those skilled in the art that the above entry address, communication flow, routing table includes the call identifier and the run identifier, the entry address, and the object of the calling program module, and the relationship between the three will be changed into the relationship between the two. The specific implementation process and communication flow are similar to those of the above examples, and are not described herein again.

Through the setting, when the executable file runs, the routing table is generated according to the preset configuration, and the routing communication of different platform program modules in the executable file is realized by using the routing table, so that the absolute decoupling among the Native component, the Flutter Native component and the Flutter dynamic component is realized, the redundant codes in the main engineering are avoided, and the development process is simplified.

Another embodiment of the present disclosure provides a computer-readable storage medium having stored thereon a computer program which, when executed by a processor, implements: receiving configuration content; and compiling and generating an executable file in response to the configuration content, where the executable file includes at least two of the Native component, the Flutter Native component and the Flutter dynamic component, and is configured to generate a routing table during running so that the Native component, the Flutter Native component and the Flutter dynamic component communicate through the routing table.

Another embodiment of the present disclosure provides a computer-readable storage medium having stored thereon a computer program which, when executed by a processor, implements: starting an executable file and generating a routing table according to configuration content, where the executable file includes at least two of a Native component, a Flutter Native component and a Flutter dynamic component; selecting an entry address from one of a Native component, a Flutter Native component and a Flutter dynamic component according to the configuration content; and executing the program according to the entry address, and communicating among the Native component, the Flutter Native component and the Flutter dynamic component through the routing table according to the configuration content.

In practice, the computer readable storage medium may take any combination of one or more computer readable media. The computer readable medium may be a computer readable signal medium or a computer readable storage medium. A computer readable storage medium may be, for example, but not limited to, an electronic, magnetic, optical, electromagnetic, infrared, or semiconductor system, device, or device, or any combination of the foregoing. More specific examples (a non-exhaustive list) of the computer readable storage medium would include the following: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present embodiment, a computer readable storage medium may be any tangible medium that can contain, or store a program for use by or in connection with an instruction execution system, device, or device.

A computer readable signal medium may include a propagated data signal with computer readable program code embodied therein, for example, in baseband or as part of a carrier wave. Such a propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, device, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (for example, through the Internet using an Internet service provider).

Figure 6:
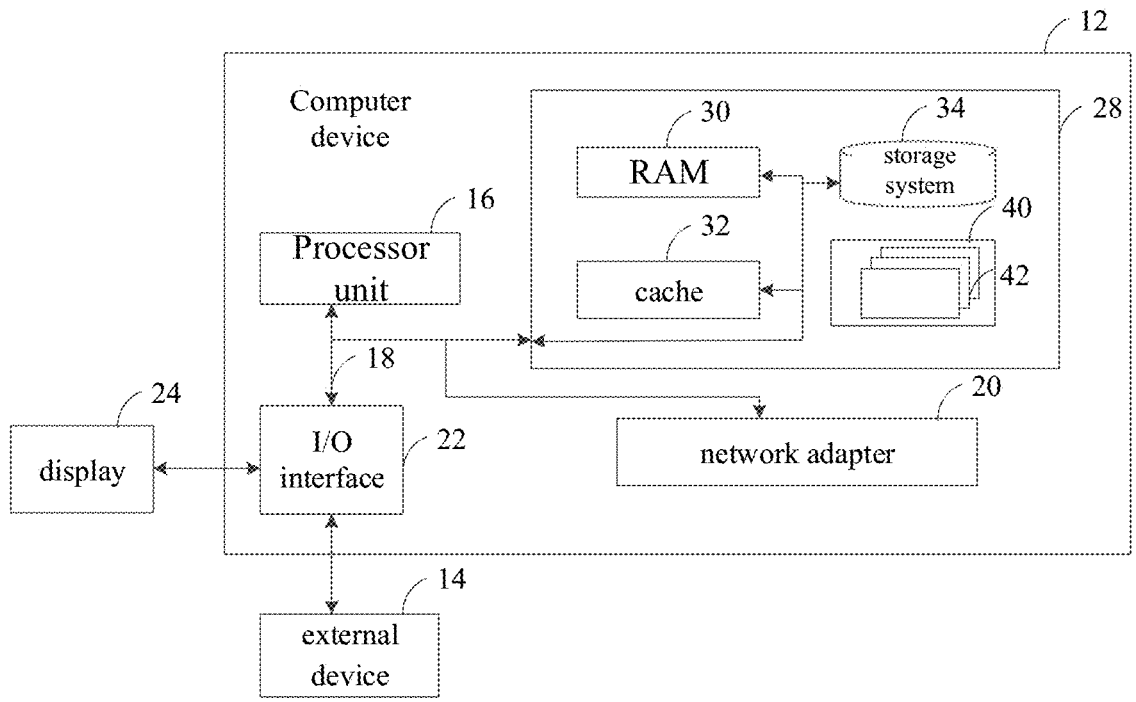
FIG. 6 shows a schematic structural diagram of a computer device according to another embodiment of the present disclosure.

As shown in FIG. 6, another embodiment of the present disclosure provides a schematic structural diagram of a computer device. The computer device 12 shown in FIG. 6 is only one example and should not impose any limitations on the functionality or scope of use of embodiments of the present disclosure.

As shown in FIG. 6, computer device 12 is in the form of a general purpose computing device. The components of computer device 12 may include, but are not limited to: one or more processors or processing units 16, a system memory 28, and a bus 18 that couples various system components including the system memory 28 and the processing unit 16.

Bus 18 represents one or more of any of several types of bus structures, including a memory bus or memory controller, a peripheral bus, an accelerated graphics port, a processor, or a local bus using any of a variety of bus architectures. By way of example, such architectures include, but are not limited to, Industry Standard Architecture (ISA) bus, micro-channel architecture (MAC) bus, enhanced ISA bus, Video Electronics Standards Association (VESA) local bus, and Peripheral Component Interconnect (PCI) bus.

Computer device 12 typically includes a variety of computer system readable media. Such media can be any available media that is accessible by computer device 12 and includes both volatile and nonvolatile media, removable and non-removable media.

The system memory 28 may include computer system readable media in the form of volatile memory, such as Random Access Memory (RAM) 30 and/or cache memory 32. The computer device 12 may further include other removable/non-removable, volatile/nonvolatile computer system storage media. By way of example only, storage system 34 may be used to read from and write to non-removable, nonvolatile magnetic media (not shown in FIG. 6, commonly referred to as a "hard drive"). Although not shown in FIG. 6, a magnetic disk drive for reading from and writing to a removable, nonvolatile magnetic disk (e.g., a "floppy disk") and an optical disk drive for reading from or writing to a removable, nonvolatile optical disk (e.g., a CD-ROM, DVD-ROM, or other optical media) may be provided. In these cases, each drive may be connected to bus 18 by one or more data media interfaces. Memory 28 may include at least one program product having a set (e.g., at least one) of program modules that are configured to carry out the functions of embodiments of the disclosure.

A program/utility 40 having a set (at least one) of program modules 42 may be stored, for example, in memory 28, such program modules 42 including but not limited to an operating system, one or more application programs, other program modules, and program data, each of which or some combination of which may include an implementation of a network environment. Program modules 42 generally carry out the functions and/or methodologies of the embodiments described in this disclosure.

Computer device 12 may also communicate with one or more external devices 14 (e.g., keyboard, pointing device, display 24, etc.), with one or more devices that enable a user to interact with computer device 12, and/or with any devices (e.g., network card, modem, etc.) that enable computer device 12 to communicate with one or more other computing devices. Such communication may be through an input/output (I/O) interface 22. Also, computer device 12 may communicate with one or more networks (e.g., a Local Area Network (LAN), a Wide Area Network (WAN), and/or a public network such as the Internet) through network adapter 20. As shown in FIG. 6, the network adapter 20 communicates with the other modules of the computer device 12 via the bus 18. It should be understood that although not shown in FIG. 6, other hardware and/or software modules may be used in conjunction with computer device 12, including but not limited to: microcode, device drivers, redundant processing units, external disk drive arrays, RAID systems, tape drives, and data backup storage systems, to name a few.

The processor unit 16 executes various functional applications and data processing by running programs stored in the system memory 28, for example, implementing a Flutter-based compiling method provided by the embodiment of the present disclosure or an execution method of an executable file obtained by using the compiling method.

It should be noted that, the sequence of the steps of the gaze tracking method provided in the embodiment of the present disclosure may be properly expressed, and the steps may also be increased or decreased according to the circumstances, and any method that can be easily changed by a person skilled in the art within the technical scope of the disclosure shall be included in the protection scope of the present disclosure, and therefore, no detailed description is given here.

Aiming at the problems in the prior art, the invention provides a compiling method, a compiling device, an executing method, a computer readable storage medium and computer equipment based on Flutter, which generate an executable file by mixed compiling in response to configuration content, generate a routing table and realize the communication among a Native component, a Flutter Native component and a Flutter dynamic component when the executable file is operated, thereby realizing the absolute decoupling among the Native component, the Flutter Native component and the Flutter dynamic component, avoiding redundant codes in main engineering, simplifying the development process and having wide application prospect.

It should be understood that the above-described embodiments of the present disclosure are merely examples for clearly illustrating the disclosure and are not intended to limit the embodiments of the disclosure, and that various other modifications and changes may be made on the basis of the above-described embodiments by those skilled in the art.

What is claimed is:

1. A Flutter-based compiling method, comprising:
   receiving configuration content;
   in response to the configuration content, compiling and generating an executable file, wherein the executable file comprises at least two of a Native component, a Flutter Native component and a Flutter dynamic component, and is configured to generate a routing table during operation, to enable the Native component, the Flutter Native component and the Flutter dynamic component to communicate with each other through the routing table.

2. The method according to claim 1, wherein the compiling and generating the executable file in response to the configuration content further comprises:
   in response to the configuration content, selecting a preset project template to establish a project; and
   compiling the project and generating the executable file.

3. The method according to claim 1, wherein the executable file comprises an executable file adapted for at least one application system;
   the application system comprises a Windows system, an Android system and an IOS system.

4. The method according to claim 3, wherein,
   the Native component is a program code written in a system language of one of the plurality of application systems, and comprises a business component and a functional component.

5. The method according to claim 1, wherein the Native component, the Flutter component and the Flutter dynamic component each comprise at least one program module,
   the in response to the configuration content, compiling and generating the executable file comprises:
   the program modules of the Native component, the Flutter Native component and the Flutter dynamic component be mutually called through the routing table.

6. A compiling device, comprising a memory, a processor, and a computer program stored on the memory and executable on the processor, wherein the processor is configured to execute the computer program to perform:
   receiving configuration content;
   in response to the configuration content, compiling and generating an executable file, wherein the executable file comprises at least two of a Native component, a Flutter Native component and a Flutter dynamic component, and is configured to generate a routing table during operation, to enable the Native component, the Flutter Native component and the Flutter dynamic component to communicate with each other through the routing table.

7. The compiling device according to claim 6, wherein the processor is configured to execute the computer program to perform:
   in response to the configuration content, selecting a preset project template to establish a project; and
   compiling the project and generating the executable file.

8. The compiling device according to claim 6, wherein the executable file comprises an executable file adapted for at least one application system;
   the application system comprises a Windows system, an Android system and an IOS system.

9. The compiling device according to claim 8, wherein,
   the Native component is a program code written in a system language of one of the plurality of application systems, and comprises a business component and a functional component.

10. The compiling device according to claim 6, wherein the Native component, the Flutter component and the Flutter dynamic component each comprise at least one program module,
    wherein the processor is configured to execute the computer program to perform:
    enabling the program modules of the Native component, the Flutter Native component and the Flutter dynamic component to be mutually called through the routing table.

11. An execution method of an executable file obtained using the compilation method according to claim 1, comprising:
    starting an executable file and generating a routing table according to configuration content, wherein the executable file comprises at least two of a Native component, a Flutter Native component and a Flutter dynamic component;
    selecting an entry address from one of the Native component, the Flutter Native component and the Flutter dynamic component according to the configuration content; and executing a program according to the entry address, and communicating among the Native component, the Flutter Native component and the Flutter dynamic component through the routing table according to the configuration content.

12. The execution method according to claim 11, wherein the Native component, the Flutter Native component and the Flutter dynamic component respectively comprises at least one program module, the starting the executable file and generating the routing table according to the configuration content further comprises:

starting the executable file and generating an execution configuration file in response to the configuration content, wherein the execution configuration file comprises an entry option and a communication flow among the Native component, the Flutter Native component and the Flutter dynamic component;

generating the routing table according to the execution configuration file, wherein the routing table comprises calling identifiers of program modules of the Native component, the Flutter Native component and the Flutter dynamic component and running identifiers corresponding to the calling identifiers;

the selecting the entry address from one of the Native component, the Flutter Native component and the Flutter dynamic component according to the configuration content further comprises: selecting an entry address of a corresponding entry program module from a Native component, a Flutter Native component and a Flutter dynamic component according to the entry option of the execution configuration file;

the executing the program according to the entry address and communicating among the Native component, the Flutter Native component and the Flutter dynamic component through the routing table according to the configuration content further comprises:

executing a corresponding program module according to the entry address and the communication flow;

acquiring the corresponding running identifier through the routing table according to the calling identifier of the communication flow; and calling the program module of the corresponding Native component, Flutter Native component or Flutter dynamic component according to the running identifier.

13. The execution method according to claim 12, wherein the calling the program module of the corresponding Native component, Flutter Native component or Flutter dynamic component according to the running identifier further comprises:

the program module of the Native component calling the program module of the Flutter Native component according to the running identifier, or the program module of the Flutter Native component calling the program module of the Native component according to the running identifier;

or

The program module of the Flutter dynamic component calling the program module of the Flutter native component according to the running identifier, or the program module of the Flutter native component calling the program module of the Flutter dynamic component according to the running identifier;

or the program module of the Native component calling the program module of the Flutter dynamic component according to the running identifier, or the program module of the Flutter dynamic component calling the program module of the Native component according to the running identifier.

14. A computer-readable storage medium storing a computer program, wherein the computer program is executed by a processor to perform the Flutter-based compiling method according to claim 1.

15. The computer-readable storage medium according to claim 14, wherein the computer program is executed by the processor to perform:

in response to the configuration content, selecting a preset project template to establish a project; and compiling the project and generating the executable file.

16. The computer-readable storage medium according to claim 14, wherein the executable file comprises an executable file adapted for at least one application system;

the application system comprises a Windows system, an Android system and an IOS system.

17. The computer-readable storage medium according to claim 16, wherein the Native component is a program code written in a system language of one of the plurality of application systems, and comprises a business component and a functional component.

18. A computer device, comprising a memory, a processor, and a computer program stored on the memory and executable on the processor, wherein the processor is configured to execute the program to perform:

starting an executable file and generating a routing table according to configuration content, wherein the executable file comprises at least two of a Native component, a Flutter Native component and a Flutter dynamic component;

selecting an entry address from one of the Native component, the Flutter Native component and the Flutter dynamic component according to the configuration content; and executing a program according to the entry address, and communicating among the Native component, the Flutter Native component and the Flutter dynamic component through the routing table according to the configuration content.

19. The computer device according to claim 18, wherein the Native component, the Flutter Native component and the Flutter dynamic component respectively comprises at least one program module, the processor is configured to execute the program to perform:

starting the executable file and generating an execution configuration file in response to the configuration content, wherein the execution configuration file comprises an entry option and a communication flow among the Native component, the Flutter Native component and the Flutter dynamic component;

generating the routing table according to the execution configuration file, wherein the routing table comprises calling identifiers of program modules of the Native component, the Flutter Native component and the Flutter dynamic component and running identifiers corresponding to the calling identifiers;

the selecting the entry address from one of the Native component, the Flutter Native component and the Flutter dynamic component according to the configuration content further comprises: selecting an entry address of a corresponding entry program module from a Native component, a Flutter Native component and a Flutter dynamic component according to the entry option of the execution configuration file;

the processor is configured to execute the program to perform:

executing a corresponding program module according to the entry address and the communication flow;

acquiring the corresponding running identifier through the routing table according to the calling identifier of the communication flow; and calling the program module of the corresponding Native component, Flutter Native component or Flutter dynamic component according to the running identifier.

20. The computer device according to claim 19, wherein the processor is configured to execute the program to perform:

calling the program module of the Flutter Native component according to the running identifier, or calling the program module of the Native component according to the running identifier;

or calling the program module of the Flutter native component according to the running identifier, or calling the program module of the Flutter dynamic component according to the running identifier;

or calling the program module of the Flutter dynamic component according to the running identifier, or calling the program module of the Native component according to the running identifier.

* * * * *